United States Patent Office 3,158,363
Patented Nov. 24, 1964

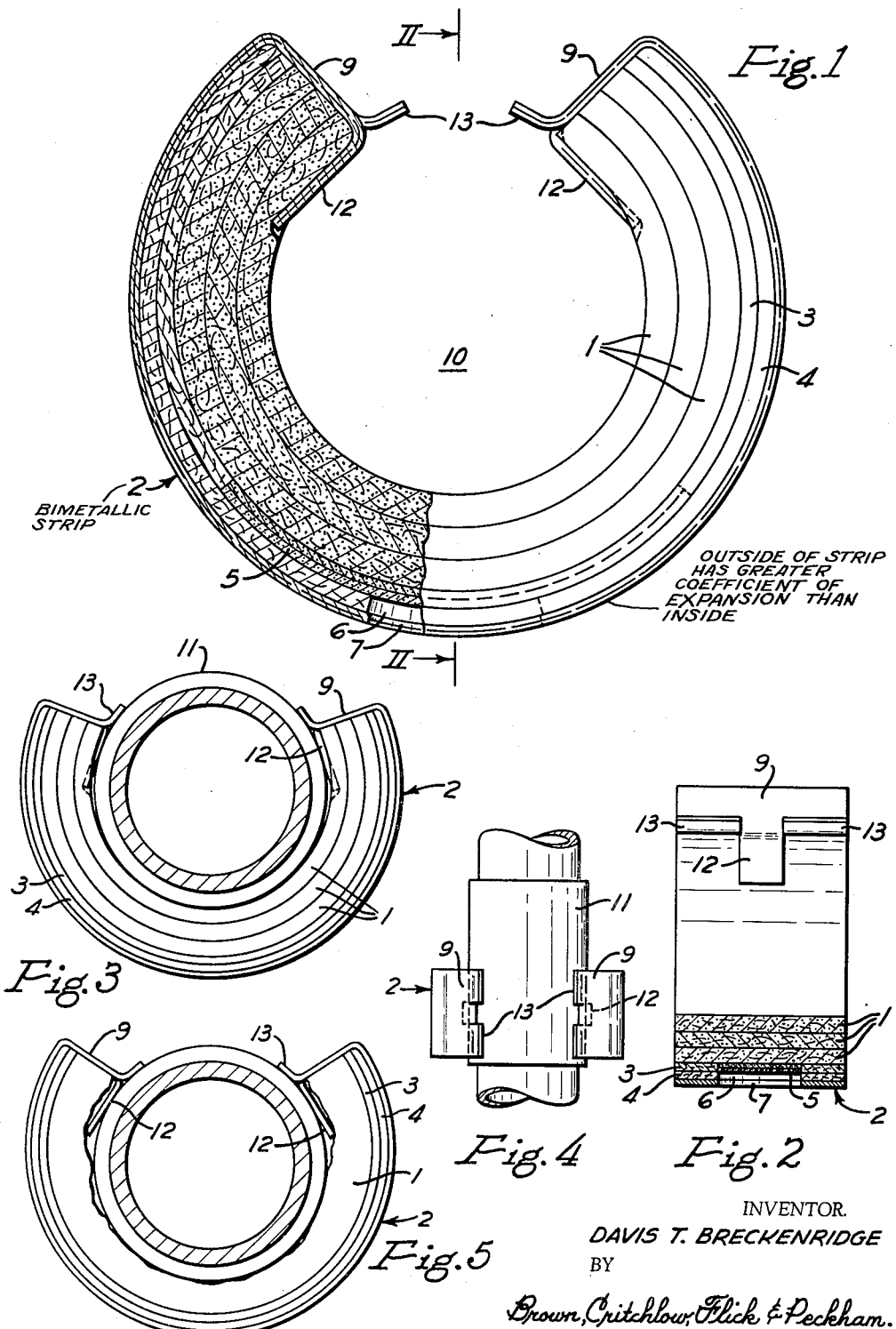

3,158,363
CLIP-ON HEATER
Davis T. Breckenridge, Lutherville, Md., assignor to Catalyst Research Corporation, Baltimore, Md., a corporation of Maryland
Filed June 10, 1963, Ser. No. 286,615
10 Claims. (Cl. 263—4)

This invention relates to devices for heating objects to which they are attached, and more particularly to heaters for pipe joints that are to be sweat-soldered.

In the plumbing field it is common practice to connect copper pipes end to end by means of fittings in which the pipes are inserted. The fittings and pipes are then heated by a blowtorch, and solder is applied to the pipes around the ends of the fittings, with the result that the solder melts and flows by capillary action into the small clearance between the pipes and the encircling fittings. The use of a blowtorch can be troublesome and it is a fire hazard, especially when the joint is to be made close to a wall or wooden joists or floor beams. Also, in making a large number of joints a considerable amount of time is consumed in heating each one and applying the solder to it before being able to move on to the next joint.

To overcome these difficulties it has been proposed to heat the joints in preparation for soldering by applying to them metal clamps that hold consumable heating material against the pipe fittings. This material is an exothermic heating composition, many forms of which are known. For example, suitable material contains 13% aluminum, 3½% boron, 51% barium chromate, 27½% crystalline aluminum oxide, and 5% non-combustible fibre. Among the disadvantages of such devices heretofore has been their cost, complexity, and the time required to fasten them in place. Also, while the heating material is being consumed in use, the heaters become loose and may move away from the location in which they should do their heating, especially when the pipes are vertical.

It is among the objects of this invention to provide a heater for pipe joints and the like, which is inexpensive and simple in construction, which can be quickly applied and removed, which holds the heating material close to the member being heated as the material is consumed, which will stay in place, and which can be used in confined spaces and close to like heaters.

The preferred embodiment of the invention is illustrated in the accompanying drawings, in which FIG. 1 is a side view of my heater, partly in section;
FIG. 2 is a cross section taken on the line II—II of FIG. 1;
FIG. 3 is a side view of the heater applied to a pipe fitting;
FIG. 4 is a side view of the fitting showing the heater mounted on it; and
FIG. 5 is a view similar to FIG. 3 but showing the heater after most of the heating material has been consumed.

Referring to FIGS. 1 and 2 of the drawings, the heater includes a flexible, longitudinally curved, elongated body 1 of consumable heating material that is surrounded by a longitudinally deformed metal strip 2. The strip, which for best results should be resilient, is shaped to clamp the heating material against a substantially cylindrical member, such as a pipe fitting for example. The heating material may be a single solid piece, but preferably it is an exothermic heating composition mixed with fibers and formed into flexible sheets that are cut into strips of the same width as the clamp. Usually two or more of these strips are placed face to face in the clamp and preferably are spaced from the metal strip by means of a pair of flexible strips 3 and 4 of insulating material to protect the clamp and reduce escape of heat outwardly through it. The inner insulating strip 3 is provided midway between its ends with a rectangular opening in which an ignition pad 5 is mounted. This pad covers a hole 6 in the outer insulating strip 4 and a registering hole 7 in the center of the clamping strip so that the pad can be ignited by a match held beneath the clamp hole. As soon as the pad is ignited, it in turn ignites the more difficultly ignitable heating material, which then produces a very intense heat for a few moments.

Metal strip 2 preferably is rectangular and curved into the general shape of a circular letter C, with inturned end portions 9 disposed at about 90° to each other. If the latter are spaced apart normally, as is preferred, the distance between them should be less than the diameter of the pipe fitting to which the clamp is to be applied, so that the clamp ends will have to be sprung apart by the fitting in order for the clamp to be attached to it. The heating material body 1 forms an arcuate recess 10 opposite or facing the space between the two ends of the metal clamp. This recess is deep enough to allow more than half of a pipe fitting 11 to be received in the clamp, as shown in FIG. 3, but it is shallow enough to cause the clamp to be distorted slightly by the fitting and to require the ends of the clamp to press against the fitting so that the clamp will hold the heating material against the fitting. The ends of the end portions of the metal strip have integral tabs 12 that are turned inward into the recess and diverge along the inner surface of body 1 in tight engagement therewith to hold the ends of the heating strips and insulating strips in place. The tabs are formed preferably by providing each end of the metal strip with a pair of parallel longitudinal slits to form three short tongues and then bending down the center tongue to form a tab 12. It also is desirable to cut off part of the two outer tongues and bend up the stubs at about a right angle to the adjoining end portion 9 to form tips 13. These outwardly converging pairs of tips form smooth surfaces that readily slide circumferentially on the pipe without digging into it.

Although the heating material in the illustrated form of the heater does not extend all of the way around the fitting, it extends for enough to heat the fitting all around to a high enough temperature for sweat-soldering the joint. Of course, the heating material could be extended farther around the fitting if the clamp were made larger. The heat is so intense that it will quickly dissipate any residual moisture in the pipe joint when a joint is being soldered in a pipe previously filled with water that has been drained out.

A principal feature of this invention is that as the heating material is consumed in use, the heater continues to press against the pipe fitting for the double purpose of keeping the heat close to the fitting and preventing the device from sliding lengthwise of the pipe out of position. This is because the clamp is bimetallic; that is, at least a portion of the metal strip 2 from which the clamp is made is bimetallic, the metal with the greater coefficient of expansion forming the outer layer of the strip. Aluminum-clad steel is preferred. When the clamp is heated by the burning body 1 the clamp attempts to contract, which causes its ends to slide toward each other around the pipe fitting and thereby pull the burning material in tightly against the fitting as shown in FIG. 5. The clamp therefore automatically compensates for the loss of heating material as it is consumed, and maintains the relatively hard ash and unconsumed material in contact with the pipe fitting to gain full advantage of the heat given off by it and to hold the heater in correct position. The hot tabs 12 will tend to swing out toward the surrounding body of the clamp and will therefore grip the ash and insulating strips tightly and thereby retard expansion of the clamp when it starts to cool.

The heaters disclosed herein can be quickly snapped on pipe fittings by a plumber's helper and then the plumber can quickly heat each joint as he comes to it by igniting the ignition pad 5. Since the heat is so intense and so closely confined to the area desired to be heated, it is only a moment until the joint is ready to receive solder. There is much less fire hazard than with the long flame of a blowtorch. The clamps, being made of thin metal strips, will stay hot only for a brief period and therefore can be removed very soon by the helper. It is obvious that these heaters do not require anything for holding them in place, such as tabs that would have to be bent after the clamps are applied to a member that is to be heated. Their construction is very simple. The C-shaped heaters have the advantage of being applicable to a pipe fitting that is so close to a wall or the like that it would be very difficult or impossible to apply a heater that had to encircle the fitting. It is desirable that the fitting project beyond a straight line joining the outermost ends of the clamp so that the clamp will not touch a surface that the outside of the fitting may engage.

Although the shape of the clamp illustrated is preferred for most applications, it will be understood that the metal strip can be bent into other configurations and still grip a pipe fitting. Also, tips 13 can be omitted, especially if end portions 9 are not bent inwardly so sharply. In such a case, tabs 12 are best made the full width of the strip.

I claim:

1. A clip-on heater suitable for heating a substantially cylindrical member, said heater comprising a bimetallic clamp adapted to extend more than half way around the member to which it is to be applied, said clamp having ends between which such a member is receivable into the clamp, and a body of consumable heating material mounted in said clamp, the outer layer of the bimetallic clamp having a greater coefficient of expansion than the inner layer so that said ends will be moved closer together when the clamp is heated by said heating mateial, whereby when the clamp is on a cylindrical member the clamp will continue to press said body toward that member as the heating material is consumed.

2. A clip-on heater according to claim 1, in which said body of heating material is flexible and substantially coextensive in length with said clamp.

3. A clip-on heater according to claim 1, in which said clamp is formed from a resilient bimetallic strip having ends that can be sprung apart by said member to admit it into the clamp.

4. A clip-on heater suitable for heating a substantially cylindrical member, said heater comprising a longitudinally curved elongated body of consumable heating material shaped to extend around such a member, and a longitudinally deformed bimetallic spring strip surrounding said body and forming a spring clamp large enough to extend more than half way around such a member to clamp said body against it, the outer layer of the bimetallic clamp having a greater coefficient of expansion than the inner layer so that when said bimetallic strip is heated by said heating material the clamp will contract, whereby when the clamp is on a cylindrical member the clamp will continue to press said body toward that member as the heating material is consumed.

5. A clip-on heater suitable for heating a substantially cylindrical member, said heater comprising a longitudinally curved elongated body of consumable heating material shaped to extend less than completely around such a member, and a longitudinally curved bimetallic spring strip surrounding said body and having inturned ends extending across the ends of said body and spaced apart a distance less than the inside diameter of said body, said strip forming a spring clamp large enough to extend in an arc of more than 180° and the outer layer of the bimetallic clamp having a greater coefficient of expansion than the interior layer to move said end portions closer together when said bimetallic strip is heated by said heating material.

6. A clip-on heater according to claim 5, in which said inturned ends have end tabs bent inwardly of the clamp against the inner surface of the end portions of said body to hold that body in place in the clamp.

7. A clip-on heater according to claim 6, in which said inturned ends also have tips converging outward.

8. A clip-on heater suitable for a cylindrical member, said heater comprising an arcuate clamp having ends spaced apart a distance adapted to be less than the diameter of the member to which the clamp is to be applied, said clamp being formed from a longitudinally curved bimetallic spring strip and said ends being adapted to be sprung apart by such a member to admit it into the clamp, and an arcuate body of consumable heating material mounted in said clamp for engagement with said member, the outer layer of the bimetallic clamp having a greater coefficient of expansion than the inner layer so that said ends will be moved closer together when said bimetallic strip is heated by said heating material.

9. A clip-on heater suitable for a cylindrical member, said heater comprising a generally C-shaped clamp having spaced end portions turned inward toward each other, the distance between said end portions normally being adapted to be less than the diameter of the member to which the clamp is to be applied, said clamp being formed from a longitudinally curved bimetallic spring strip and said end portions being adapted to be springable apart by said member to admit it into the clamp, and an arcuate body of consumable heating material mounted in said clamp and provided with an arcuate recess facing the space between said end portions for receiving said member, the outer layer of the bimetallic clamp having a greater coefficient of expansion than the inner layer so that said end portions will be moved closer together when said bimetallic strip is heated by said heating material.

10. A clip-on heater according to claim 9, in which said clamp end portions are bent into said recess and diverge along said body in engagement therewith to hold the body in place.

References Cited in the file of this patent

UNITED STATES PATENTS

| 2,667,865 | Herman | Feb. 2, 1954 |
| 2,745,368 | Klein | May 15, 1956 |
| 3,074,704 | Ronay | Jan. 22, 1963 |